No. 707,666. Patented Aug. 26, 1902.
H. WOODWARD.
ELECTRODE FOR STORAGE BATTERIES.
(Application filed Jan. 15, 1901.)

(No Model.)

WITNESSES
INVENTOR.
Henry Woodward.
ATTORNEYS

UNITED STATES PATENT OFFICE.

HENRY WOODWARD, OF LONDON, ENGLAND.

ELECTRODE FOR STORAGE BATTERIES.

SPECIFICATION forming part of Letters Patent No. 707,666, dated August 26, 1902.

Application filed January 15, 1901. Serial No. 43,315. (No model.)

*To all whom it may concern:*

Be it known that I, HENRY WOODWARD, a subject of the Queen of Great Britain, residing at London, England, have invented certain new and useful Improvements in Electric Accumulators or Secondary Batteries, of which the following is a specification.

My invention has for its object improvements in electrical accumulators or secondary batteries and in the manufacture of the same, by which I am enabled to materially reduce the weight of such accumulators and at the same time provide better means for retaining or holding the oxid of lead upon the positive and negative plates, which forms the active material of the accumulator.

In order that my invention may be more clearly understood and easily carried into practical effect, I have appended hereunto a sheet of drawings upon which I have shown examples of my positive and negative plates for electrical accumulators.

Figure 1:
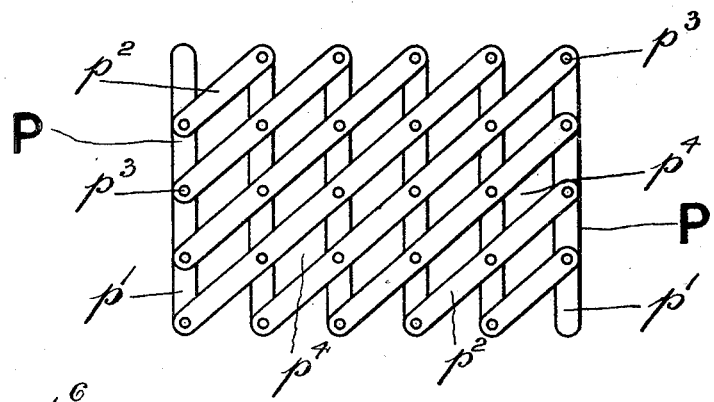
Figure 2:
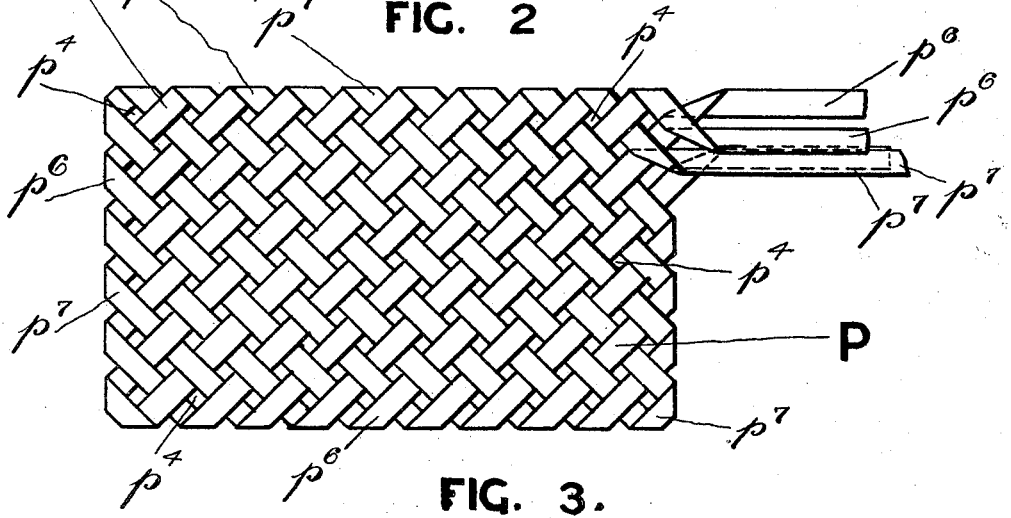
Figure 3:
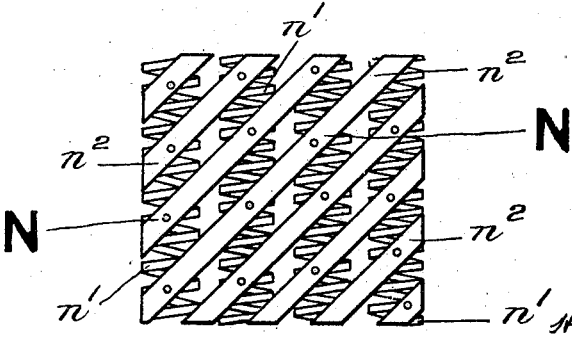

Figure 1 is a view of a positive plate made according to my invention, showing the same partially closed. Fig. 2 is a view showing a positive plate made from two strips or tapes of lead according to my invention. Fig. 3 is a view of a negative plate made according to my invention.

In carrying my invention into practice I form the positive plates P of my accumulators from thin strips or tapes $p'$ and $p^2$ of lead. These strips or tapes are united together into the form of trellis or lattice work, as clearly shown by Fig. 1—*i. e.*, the row of strips or tapes $p'$ are placed perpendicular, as shown, or they may be placed horizontal. The tapes or strips $p^2$ are then placed diagonally across the strips $p'$, each diagonal strip being connected by pins or rivets $p^3$ to each perpendicular strip $p'$, thus forming openings $p^4$ by the crossing of the strips $p'$ and $p^2$, which openings can be easily increased or decreased, as desired. When the plate is covered with oxid of lead, these openings $p^4$ serve as a means for holding or retaining the oxid of lead or active material in position.

The expansion and contraction of the perforations in the form of plate, Fig. 1, can be effected by adjusting the strands by hand by pressure exerted in the plan of the plate and transversely of the same.

In some cases I may form the positive plates P from two continuous strips or tapes interwoven or crossed one with the other into the form of trellis or lattice work, as clearly shown by Fig. 2, the strips or tapes in this case not being connected together at the parts where they overlap each other by pins or rivets. It will be evident that I may use one continuous strip or tape instead of the aforesaid, if desired.

The negative plate N may be formed from a number of thin strips or tapes $n'$ of lead or round lengths of lead twisted or formed spirally into the desired shape, and the flat strips or tapes $n^2$ pivotally connected diagonally across the spiral strips or tapes $n'$, as shown at Fig. 3, or the negative plates may be made entirely of spiral strips or tapes.

What I claim, then, is—

An accumulator-plate comprising a plurality of strips crossing each other and pivotally connected together to permit expansion and contraction.

In witness whereof I have hereunto set my hand in presence of two witnesses.

HENRY WOODWARD.

Witnesses:
 E. S. FRIEND,
 ERNEST HY SALE.